(12) United States Patent  (10) Patent No.: US 6,689,968 B2
Trivette et al.  (45) Date of Patent: Feb. 10, 2004

(54) CIRCUIT BREAKER WITH CAPACITOR DISCHARGE SYSTEM

(75) Inventors: Marty L. Trivette, Cary, NC (US);
Richard E. Tyner, Florence, SC (US);
Murray K. Jones, Johnsonville, SC (US)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 10/051,885

(22) Filed: Jan. 17, 2002

(65) Prior Publication Data

US 2003/0184945 A1 Oct. 2, 2003

Related U.S. Application Data

(63) Continuation-in-part of application No. 10/023,568, filed on Dec. 18, 2001.

(51) Int. Cl.[7] .................................................. H01H 9/20
(52) U.S. Cl. ............................. 200/50.21; 200/50.26; 218/155
(58) Field of Search ...................... 200/50.01, 50.31, 200/50.35, 50.02–50.26, 50.27; 218/154, 155, 78, 84, 120, 140, 153

(56) References Cited

U.S. PATENT DOCUMENTS

| | | | | |
|---|---|---|---|---|
| 3,567,886 A | * | 3/1971 | Ross ............................. 200/401 |
| 3,772,489 A | * | 11/1973 | Wilson ..................... 200/50.23 |
| 3,823,288 A | | 7/1974 | Wilson .................... 200/144 B |
| 3,958,156 A | * | 5/1976 | Tjebben ........................ 361/606 |
| 4,101,816 A | | 7/1978 | Shepter ........................ 318/130 |
| 4,206,329 A | | 6/1980 | Jarosz .................... 200/50 AA |
| 4,259,713 A | | 3/1981 | Flisberg et al. ................ 363/35 |
| 4,713,501 A | * | 12/1987 | Herrmann .................. 200/50.22 |
| 4,761,521 A | | 8/1988 | Beck et al. ............. 200/50 AA |
| 4,926,286 A | | 5/1990 | Maki et al. ................... 361/345 |
| 5,206,468 A | | 4/1993 | Kobayashi et al. ..... 200/50 AA |
| 5,303,111 A | | 4/1994 | Yamaguchi ................... 361/19 |
| 5,379,014 A | | 1/1995 | Sato et al. ................... 335/177 |
| 5,434,369 A | | 7/1995 | Tempco et al. .......... 200/50 AA |
| 6,031,192 A | | 2/2000 | Liebetruth ............... 200/50.21 |
| 6,177,641 B1 | | 1/2001 | Morel et al. ............. 200/50.26 |

* cited by examiner

*Primary Examiner*—Elvin Enad
*Assistant Examiner*—Lisa Klaus
(74) *Attorney, Agent, or Firm*—Woodcock Washburn LLP

(57) ABSTRACT

A presently-preferred capacitor discharge system for a circuit breaker adapted for use in a switchgear enclosure comprises a capacitor discharge circuit adapted to be electrically coupled to the capacitor, and a contact switch electrically coupled to the capacitor discharge circuit and adapted to be mechanically coupled to a support truck of the circuit breaker. The contact switch is movable between a first and a second position. The system also comprises a resistor electrically coupled to the capacitor discharge circuit, and a lever arm adapted to be rigidly coupled to a racking mechanism of the circuit breaker and adapted to urge the contact switch into the closed position when a locking arm of the racking mechanism disengages from the switchgear enclosure. The capacitor discharge system is adapted to electrically couple the capacitor and the resistor when the contact switch is in the second position thereby discharging the capacitor.

28 Claims, 9 Drawing Sheets

CIRCUIT BREAKER WITH CAPACITOR DISCHARGE SYSTEM

This application is a continuation-in-part of prior application Ser. No. 10/023,568, which was filed on Dec. 18, 2001 and is incorporated herein by reference in its entirety.

FIELD OF THE INVENTION

The present invention related to circuit breakers for use in electrical circuits. More particularly. the invention relates to a system for automatically discharging the capacitor of a magnetically or electrically-actuated circuit breaker upon removal of the circuit breaker from its enclosure.

BACKGROUND OF THE INVENTION

Magnetic and electrically-actuated circuit breakers typically comprise one or more capacitors that store electrical energy in the form of an electric field. The electrical energy is used to energize the coils of an actuator mechanism that opens and closes the contact of the circuit breaker. The electric field within the capacitor of a power circuit breaker can have a magnitude of one farad or greater. Electrical fields of this magnitude can cause serious injury or death to personnel exposed to the electrical field. For example, maintenance personnel removing a circuit breaker from its enclosure for service or replacement can easily be exposed to the electrical field stored in circuit breaker's capacitors if adequate safety measures are not observed. Hence, regulatory authorities often require some type of safeguard against such exposure. For example, American National Standards Institute (ANSI) C37.20.2 requires that magnetic and electrically-actuated circuit breakers have some type of mechanism that automatically discharges the stored energy of the circuit breaker's capacitors before or during removal of the circuit breaker from its enclosure.

Medium-voltage circuit breakers are often housed in relatively compact switchgear enclosures. Hence, any safety-related measure added to such a circuit breaker must not cause the dimensions of the circuit breaker to exceed those of its enclosure. Furthermore, minimizing the cost and complexity of a particular safety measure encourages adoption of the safety measure, and therefore is particularly desirable.

A need therefore exists for a simple, compact, and inexpensive system for automatically discharging the capacitor of a circuit breaker upon removal of the circuit breaker from its housing or enclosure.

SUMMARY OF THE INVENTION

A presently-preferred embodiment of a circuit breaker adapted to be installed in a switchgear enclosure comprises a support truck comprising a longitudinally-oriented member, a laterally-oriented member fixedly coupled the longitudinally-oriented member, and a wheel rotatably coupled to the laterally-oriented member. The circuit breaker also comprises a contact mechanism fixedly coupled to the support truck and comprising a first and a second contact member. The circuit breaker further comprises an actuator mechanism comprising a coil, a capacitor adapted to energize the coil on a selective basis, and an armature mechanically coupled to the second contact member and adapted to urge the second contact member into electrical contact with the first contact member in response to energization of the coil.

The circuit breaker also comprises a racking mechanism adapted to move the support truck in relation to the switchgear enclosure. The racking mechanism comprises a channel member and a locking arm mechanically coupled to the channel member and movable between a locked position wherein the locking arm is adapted to engage a slot on the switchgear enclosure, and an unlocked position wherein the locking arm is disengaged from the slot.

The circuit breaker further comprises a capacitor discharge system comprising a switch lever rigidly coupled to the locking arm, a capacitor discharge circuit, a contact switch mechanically coupled to the support truck and movable between an open and a closed position, a resistor electrically coupled to the capacitor discharge circuit and the capacitor, and a relay electrically coupled to the capacitor discharge circuit, the capacitor, and the resistor. The switch lever is adapted to move the contact switch from the open to the closed position when the locking arm is moved from the locked to the unlocked position, and the capacitor discharge circuit is adapted to energize the relay when the contact switch is moved to the closed position thereby establishing electrical contact between the capacitor and the resistor.

A presently-preferred embodiment of a circuit breaker adapted for use in a switchgear enclosure comprises a support truck adapted to translate in relation of the switchgear enclosure, and a first and a second contact member mounted on the support truck. The circuit breaker also comprises a coil, a capacitor adapted to energize the coil, and an armature adapted to move the second contact member in response to energization of the coil. The circuit breaker further comprises a racking mechanism comprising a locking arm movable between a locked position wherein the locking arm is adapted to engage the switchgear enclosure, and an unlocked position wherein the locking arm is disengaged from the switchgear enclosure.

The circuit breaker also comprises a capacitor discharge system comprising a capacitor discharge circuit electrically coupled to the capacitor, and a contact switch mechanically coupled to the support truck and electrically coupled to the capacitor discharge circuit and being movable between a first and a second position. The capacitor discharge system also comprises a resistor electrically coupled to the capacitor discharge circuit, and a lever arm rigidly coupled to the locking arm and adapted to move the contact switch from the first to the second position when the locking arm is moved from the locked to the unlocked position. The capacitor discharge system is adapted to electrically couple the capacitor and the resistor when the contact switch is in the second position.

Another presently-preferred embodiment of a circuit breaker adapted for use in a switchgear enclosure comprises a support truck, a contact member mounted on the support truck, and a coil. The circuit breaker also comprises a capacitor adapted to energize the coil, and an armature adapted to move the contact member in response to energization of the coil.

The circuit breaker also comprises a racking mechanism adapted to move the support truck in relation to the switchgear enclosure and comprising a locking arm movable between a locked position wherein the locking arm is adapted to engage the switchgear enclosure, and an unlocked position wherein the locking arm is disengaged from the switchgear enclosure.

The circuit breaker also comprises a capacitor discharge system comprising a resistor and a capacitor discharge circuit adapted to electrically couple the capacitor and the resistor in response to movement of the locking arm from the locked to the unlocked positions.

A presently-preferred system for automatically discharging a capacitor of a circuit breaker adapted for use in a switchgear enclosure comprises a capacitor discharge circuit adapted to be electrically coupled to the capacitor, and a contact switch electrically coupled to the capacitor discharge circuit and adapted to be mechanically coupled to a support truck of the circuit breaker. The contact switch is movable between a first and a second position. The system also comprises a resistor electrically coupled to the capacitor discharge circuit, and a lever arm adapted to be rigidly coupled to a racking mechanism of the circuit breaker and adapted to urge the contact switch into the closed position when a locking arm of the racking mechanism disengages from the switchgear enclosure. The capacitor discharge system is adapted to electrically couple the capacitor and the resistor when the contact switch is in the second position thereby discharging the capacitor.

A presently-preferred method of removing a circuit breaker from a switchgear enclosure to minimize a possibility of personnel injury caused by contact with a capacitor of the circuit breaker comprises disengaging a locking handle of the circuit breaker from the switchgear enclosure and moving a contact switch of the circuit breaker to a closed position to establish electrical contact between the capacitor and a resistor by moving the locking handle from a locked to an unlocked position. The method also comprises applying a force to the circuit breaker to urge the circuit breaker out of the switchgear enclosure.

BRIEF DESCRIPTION OF THE DRAWINGS

For the purpose of illustrating the invention, the drawings show an embodiment that is presently preferred. The invention is not limited, however, to the specific instrumentalities disclosed in the drawings. In the drawings.

DESCRIPTION OF THE PREFERRED EMBODIMENTS

FIGS. 1–9 depict a magnetically-actuated circuit breaker 10 incorporating a presently-preferred embodiment of a capacitor discharge system. The figures are referenced to a common coordinate system 8 depicted therein. Details of the circuit breaker 10 are presented for exemplary purposes only; the capacitor discharge system can be used in conjunction with virtually any type of magnetically or electrically-actuated circuit breaker.

The circuit breaker 10 is adapted for use in switchgear of electrical power distribution systems. In particular, the circuit breaker 10 is adapted for installation in a switchgear enclosure (the switchgear enclosure is not depicted in the figures, for clarity).

Figure 1:
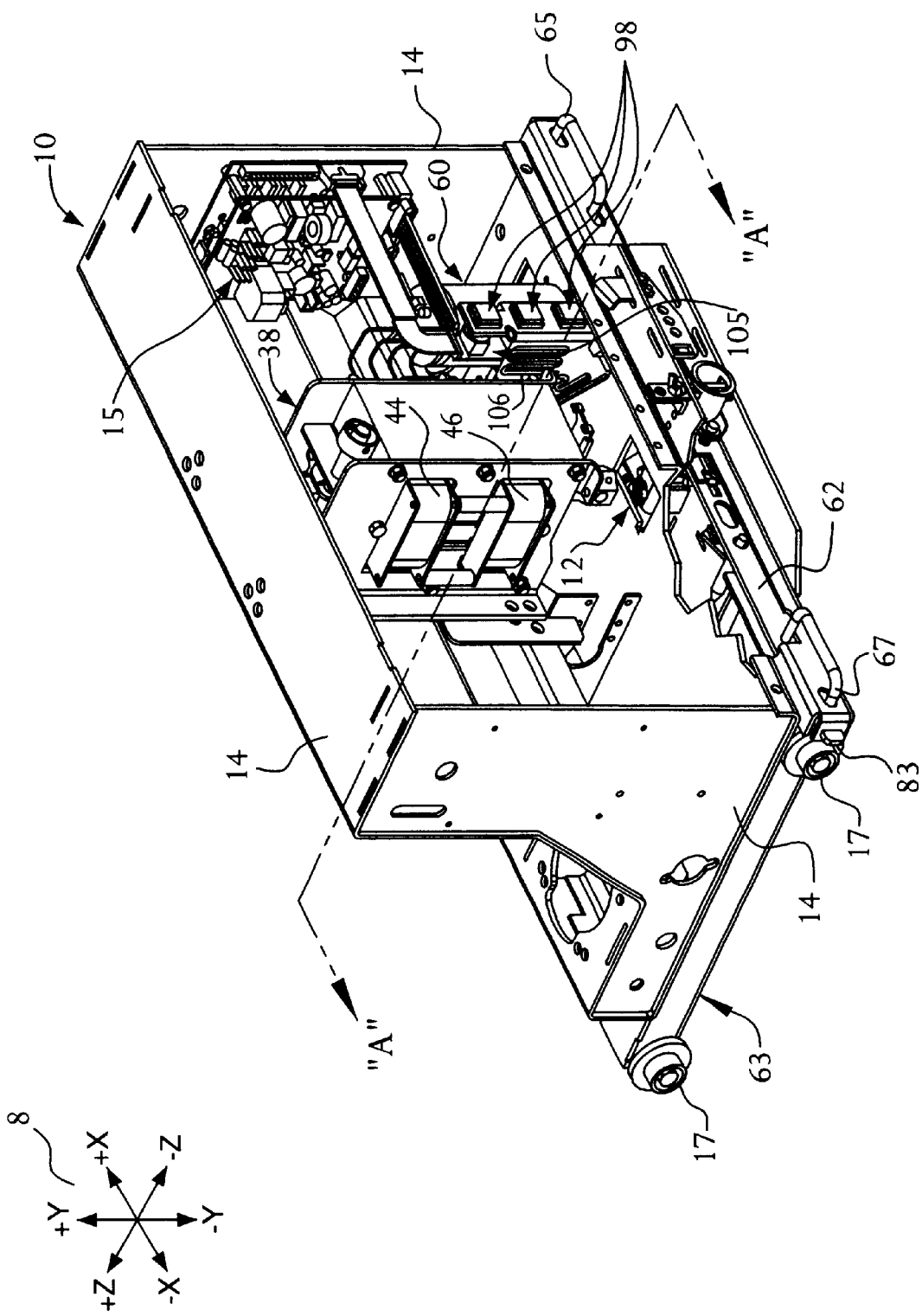
FIG. 1 is a top, front perspective view of a presently-preferred circuit breaker having a capacitor-discharge system.
Figure 2:
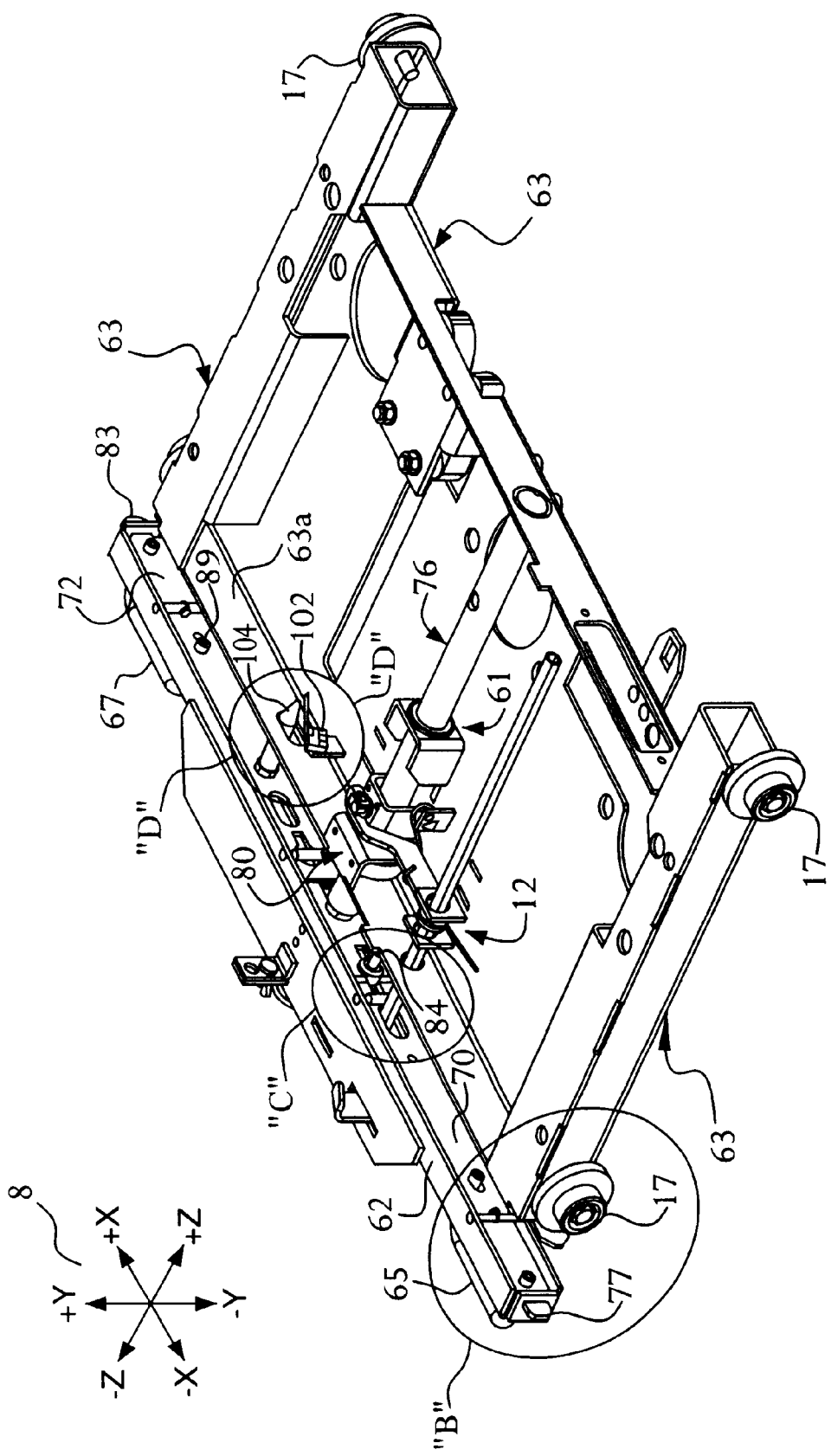
FIG. 2 is a top, rear perspective view of a racking mechanism and a support truck of the circuit breaker shown in FIG. 1.

The circuit breaker 10 comprises a frame member 14 and a support truck 63 (see FIGS. 1 and 2). The frame member 14 is mounted on the support truck 63. The support truck 63 is adapted to be installed in the switchgear enclosure, and translates in relation to the switchgear enclosure on wheels 17 rotatably coupled thereto.

Figure 8:
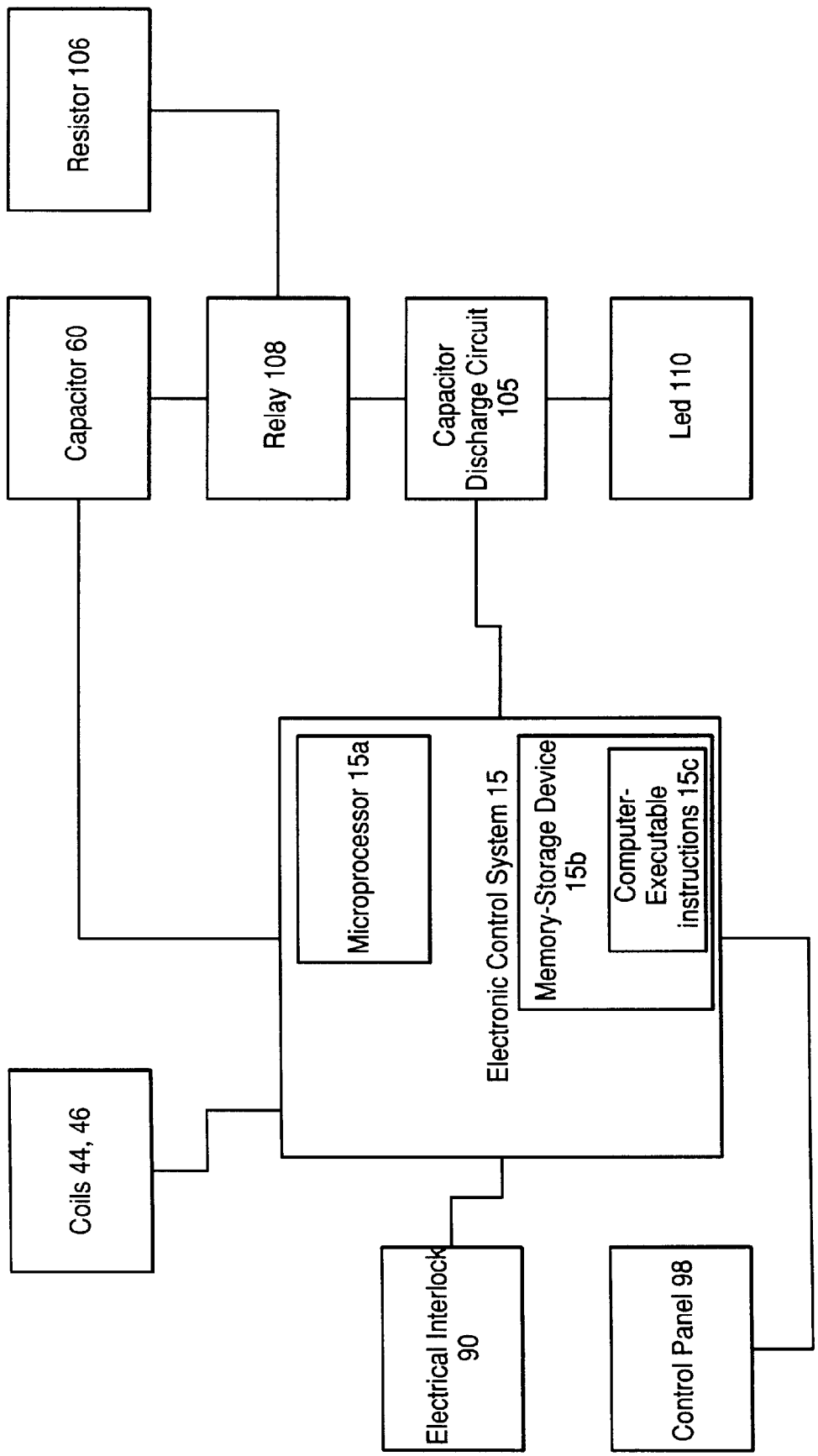
FIG. 8 is a block diagram of various electrical and electronic components of the circuit breaker shown in FIGS. 1–7.
Figure 9A:
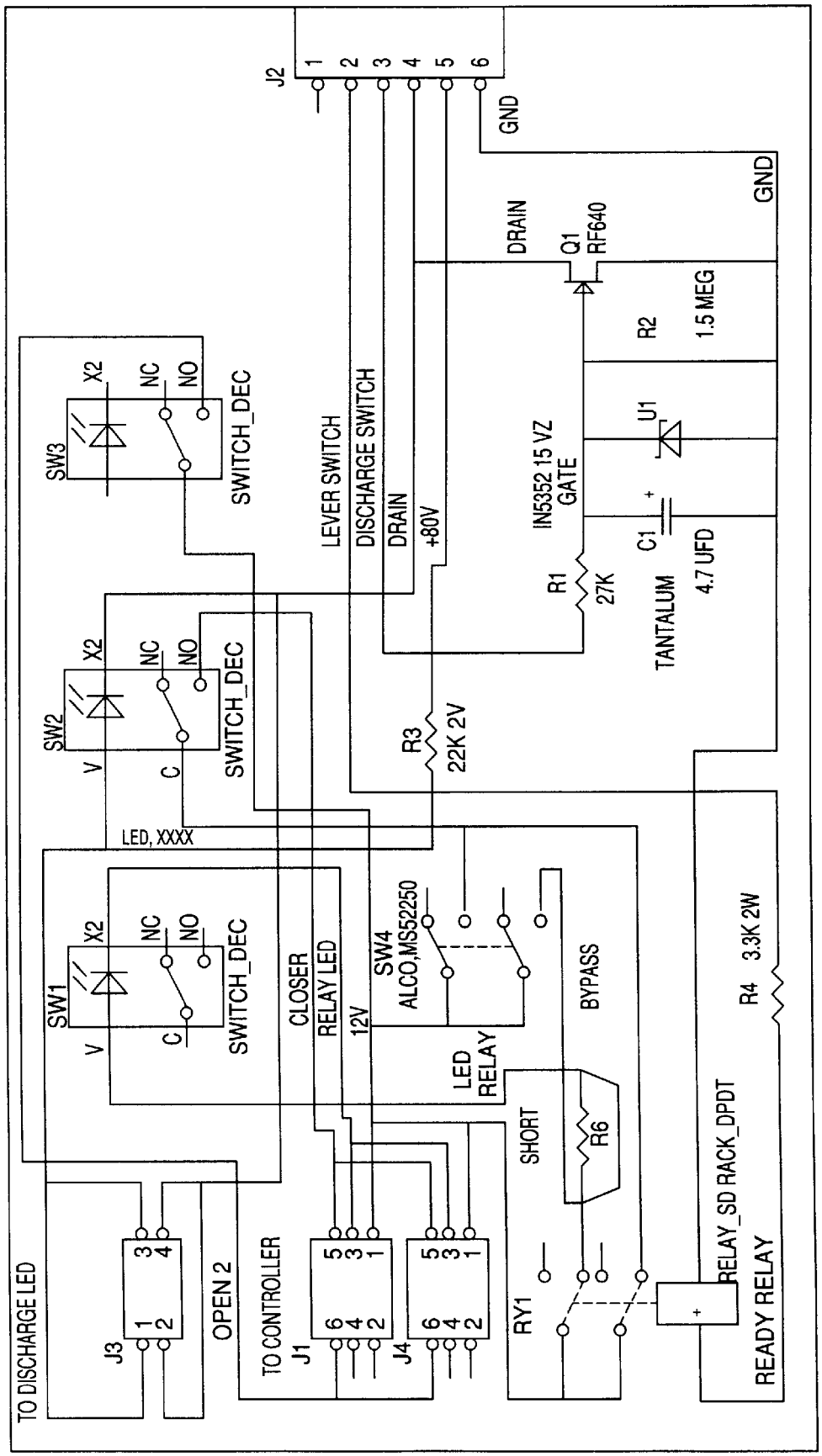
FIGS. 9A and 9B are a schematic illustration of a capacitor discharge circuit of the circuit breaker shown in FIGS. 1–8.
Figure 9B:
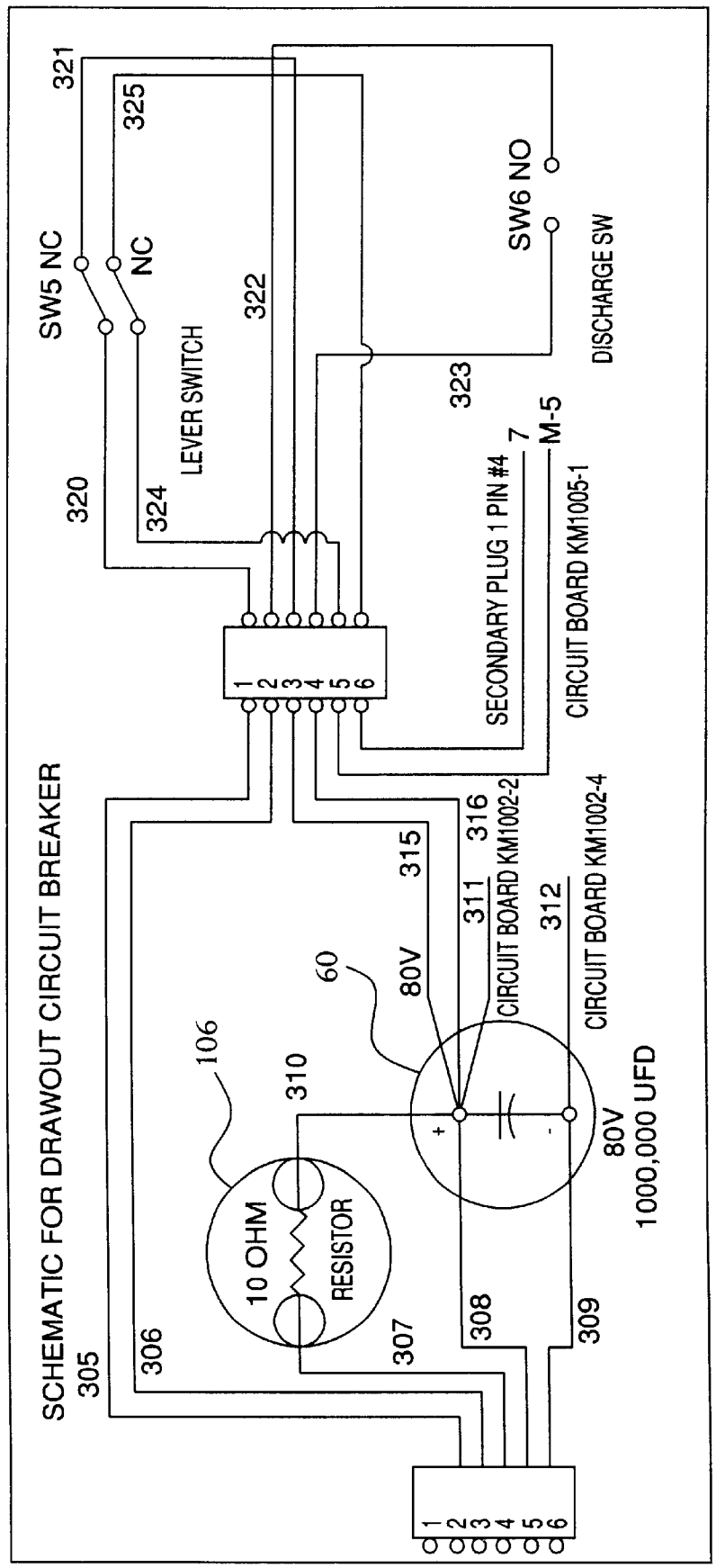

The circuit breaker 10 also comprises an electronic control system 15 (see FIGS. 1 and 8). The electronic control system 15 comprises a microprocessor 15a, a memory-storage device 15b electrically coupled to the microprocessor 15a, and a set of computer-executable instructions 15c stored on the memory-storage device 15b.

Figure 3:
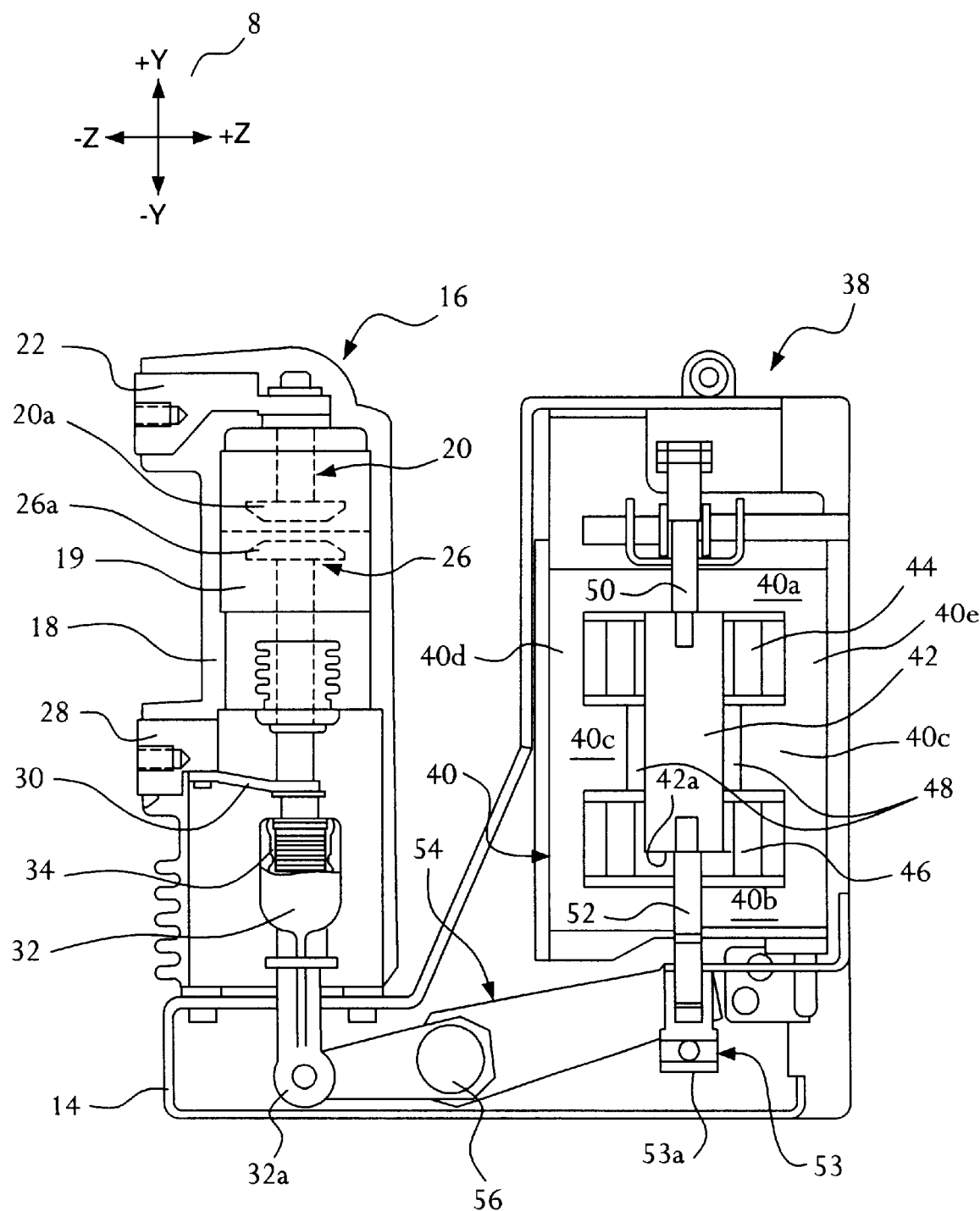
FIG. 3 is a cross-sectional view taken through the line "A—A" of FIG. 1.

The circuit breaker 10 further comprises a contact mechanism 16 (see FIG. 3). The contact mechanism 16 comprises a casing 18 fixedly coupled to the frame member 14. The contact mechanism 16 also comprises a vacuum interrupter 19, an electrically conductive upper contact 20, and an electrically-conductive lower contact 26 each disposed within the casing 18.

The upper contact 20 is fixedly coupled to the casing 18, and has an end portion 20a positioned within the vacuum interrupter 19. The lower contact 26, as explained in detail below, is adapted to translate vertically, i.e., in the "y" direction, between an "open" position and a "closed" position. The lower contact 26 contacts the upper contact 20 when the lower contact 26 is in the closed position, thereby facilitating the flow of electrical current through the contacts 20, 26. The lower contact 26 is spaced apart from the upper contact 20 when the lower contact 26 is in the open position, thereby preventing the flow of electrical current through the contacts 20, 26.

(It should be noted that directional terms such as "upper," "lower," "downward," and "upward" are used in reference to the component orientations depicted in FIGS. 1–3; these terms are used for illustrative purposes only, and are not intended to limit the scope of the appended claims.)

The lower contact 26 is fixedly coupled to an insulated push rod 32, and has an end portion 26a positioned within the vacuum interrupter 19. A wipe spring 34 biases the lower contact 26 downward, i.e., in the "–y" direction.

The contact mechanism 16 also includes an upper primary terminal 22 and a lower primary terminal 28. The upper primary terminal 22 is fixedly coupled to an upper portion of the casing 18, and is electrically coupled to the upper contact 20. The lower primary terminal 28 is fixedly coupled to a lower portion of the casing 18, and is electrically coupled to the lower contact 26 via a flexible connector 30. The upper and lower primary terminals 22, 28 are adapted to be electrically coupled to a medium-voltage electrical circuit of an electrical power distribution system (hereinafter referred to as "the electrical circuit"). More particularly, the upper and lower primary terminals 22, 28 are each adapted to engage a respective stab (not shown) fixedly coupled to an inner surface of the switchgear enclosure in which the circuit breaker 10 is mounted. Contact between the primary terminals 22, 28 and the stabs establishes electrical contact between the circuit breaker 10 and the electrical circuit.

The circuit breaker 10 further comprises a magnetic actuator 38 (see FIG. 3). The magnetic actuator 38 comprises a core 40, an armature 42, an upper or "open" coil 44, a lower or "close" coil 46, and a permanent magnet 48. The core 40 is fixedly coupled to the frame member 14. The core 40 includes an upper leg 40a, a lower leg 40b, and two intermediate legs 40c that each extend substantially in the "z" direction denoted in the figures. The core 40 also includes a first yoke 40d and a second yoke 40e fixedly coupled to the upper, lower and intermediate legs 40a, 40b, 40c. The first and second yokes 40d, 40e each extend substantially in the "y" direction.

The armature 42 is disposed between the upper and lower legs 40a, 40b, and is adapted to translate vertically, i.e., in the "y" direction, between a lower or "closed" position and an upper or "open" position. The armature 42 is supported and guided by an upper pin 50 fixedly coupled to an upper portion of the armature 42 and extending through the upper leg 40a, and a lower pin 52 fixedly coupled to a lower portion of the armature 42 and extending through the lower leg 40b. An adjustment coupling 53 is threadably coupled to an end of the lower pin 52.

The adjustment coupling 53 is rotatably coupled to an end of a pivot arm 54. An opposing end of the pivot arm 54 is rotatably coupled to an end 32a of the push rod 32. The pivot arm 54 is pivotally coupled to the frame member 14 by a shaft 56. The adjustment coupling 53 facilitates adjustment of the gap that exists between the upper and lower contacts 20, 26 when the lower contact 26 is in the open position.

The upper coil 44 is fixedly coupled to the core 40, between the upper and intermediate legs 40a, 40c. The upper coil 44 surrounds an upper portion of the armature 42. The lower coil 46 is fixedly coupled to the core 40, between the lower and intermediate legs 40b, 40c. The lower coil 46 surrounds a lower portion of the armature 42. The permanent magnet 48 is fixed to ends of the intermediate legs 40c as depicted in FIG. 3, and are thus positioned between the intermediate legs 40c and the armature 42.

The circuit breaker 10 further comprises a capacitor 60 electrically coupled to the upper and lower coils 44, 46 via the electronic control system 15 (see FIGS. 1 and 8). the capacitor 60 is adapted to store electrical energy used to energize the upper and lower coils 44, 46. The capacitor 60 has a capacitance of approximately 100 K $\mu$-farads, and is supplied with a voltage of approximately 80 volts by the electronic control system 15. (It should be noted that the capacitance and voltage of the capacitor 60 are application-dependent; specific values for these parameters are specified for exemplary purposes only.)

The contact mechanism 16 and the magnetic actuator 38 cooperate to open and close the upper and lower contacts 20, 26 in response to a signal from the electronic control system 15. More particularly, the electronic control system 15 is adapted to selectively energize the upper and lower coils 44, 46 using the electrical energy stored in the capacitor 60. Energizing the lower coil 46 causes the end portion 26a of the lower contact 26 to abut (contact) the end portion 20a of the upper contact 20, thereby closing the contacts 20, 26 and permitting electrical current to flow between the upper and lower primary terminals 22, 28. Energizing the upper coil 44 causes the end portion 26a of the lower contact 26 to move away from the end portion 20a of the upper contact 20, thereby interrupting the flow of electrical current between the upper and lower primary terminals 22, 28. Specific details concerning this feature are as follows.

The force needed to open and close the contacts 20, 26 is provided primarily by the magnetic actuator 38. In particular, closure of the contacts 20, 26 is effectuated by energizing the lower coil 46. The energized coil 46, in conjunction with the permanent magnet 48, generates a magnetic flux. The magnetic flux is conducted by the core 40, and generates a magnetic potential across the core 40 that drives the armature 42 downward, i.e., in the "−y" direction.

Downward movement of the armature 42 causes a corresponding downward movement in the lower pin 52. The downward movement of the lower pin 52 causes the pivot arm 54 to rotate in a clockwise direction about the shaft 56 (from the perspective of FIG. 3). The clockwise rotation of the pivot arm 54 imparts an upward movement to the push rod 32. Upward movement of the push rod 32 drives the lower contact 26 into contact with the upper contact 20, thereby establishing electrical contact between the upper and lower primary terminals 22, 28.

The contacts 20, 26 are opened by energizing the upper coil 44. The energized coil 44 and the permanent magnet 48 generate a magnetic flux across the core 40 that drives the armature 42 upward. The upward movement of the armature 42 causes a corresponding upward movement in the lower pin 52 which, in turn, causes the pivot arm 54 to rotate in a counterclockwise direction about the shaft 56. The counterclockwise rotation of the pivot arm 54 imparts a downward movement to the push rod 32 and the lower contact 26, thereby interrupting electrical contact between the upper and lower primary terminals 22, 28 (the contacts 20, 26 are depicted in the open position in FIG. 3).

The electronic control system 15 is adapted to energize the upper or lower coils 44, 46 in response to user input commanding the closing or opening of the contacts 20, 26 (such input may be generated by, for example, a pushbutton control panel 98 mounted on the circuit breaker 10, as shown in FIG. 1).

The circuit breaker 10 further comprises a racking mechanism 61 (see FIGS. 1 and 2). The racking mechanism 61 is adapted to move the frame member 14, the contact mechanism 16, the magnetic actuator 38, and the electronic control system 15 within the switchgear enclosure. More particularly, the racking mechanism 61 is adapted to move (or "rack") the noted components between a connect position, a test position, and a disconnect position.

The primary terminals 22, 28 engage the stabs of the switchgear enclosure via primary disconnects (not shown) when the circuit breaker is in the connect position, thereby permitting current to flow through the contacts 20, 26 if the contacts 20, 26 are in the closed position. The primary terminals 22, 28 do not engage the stabs when the circuit breaker is configured in the test and disconnect positions, thus preventing the flow of current through the contacts 20, 26 regardless of the position thereof.

The racking mechanism 61 comprises a channel member 62. A coupling 78 is mounted on the channel member 62 (see FIG. 5). The racking mechanism 61 also includes a lead screw 76 coupled to the channel member 62 via the coupling 78. The coupling 78 restrains the lead screw 76 linearly, i.e., in the "x," "y," and "z" directions, while permitting the lead screw 76 to rotate in relation to the channel member 62. The coupling 78 is adapted to mate with a rotary tool such as an electric drill, a socket wrench, or an impact wrench, thus facilitating rotation of the lead screw 76 using the rotary tool.

The racking mechanism 61 also includes a screw block 80. The screw block 80 is fixedly coupled to the support truck 63, and is rotatably coupled to the lead screw 76. In particular, threads on the lead screw 76 engage corresponding threads on the screw block 80. The torque associated with the rotation of the lead screw 76 is transmitted to the screw block 80 via the threads, thereby imparting linear movement to the screw block 80 in the "z" direction. This movement is transmitted to the support truck 63, which rolls in the "z" direction on the wheels 17. The translation of the support truck 63 causes a corresponding movement of the contact mechanism 16 toward or away from the stabs of the switchgear enclosure. (It should be noted that the threads on the lead screw 76 and the screw block 80 are not depicted in the figures, for clarity.)

The racking mechanism 61 also comprises a first truck handle 65, a second truck handle 67, a first locking arm 70, and a second locking arm 72. The first truck handle 65 is fixedly coupled to the first locking arm 70, and the second truck handle 67 is fixedly coupled to the second locking arm 72.

The first and second locking arms 70, 72 are slidably disposed within the channel member 62, i.e., the first and second locking arms 70, 72 are positioned within the channel member 62, and are adapted to slide in the "x" direction. The first and second truck handles 65, 67 project through slots 74 formed in the channel member 62. The slots 74 are elongated in the "x" direction, and thus facilitate movement of the truck handles 65, 67 in the "x" direction. In particular, the truck handles 65, 67 are adapted to translate between an outward, or "locked," position (as depicted in FIGS. 1, 2, 4, and 5) and an inward, or "unlocked" position.

Figure 4:
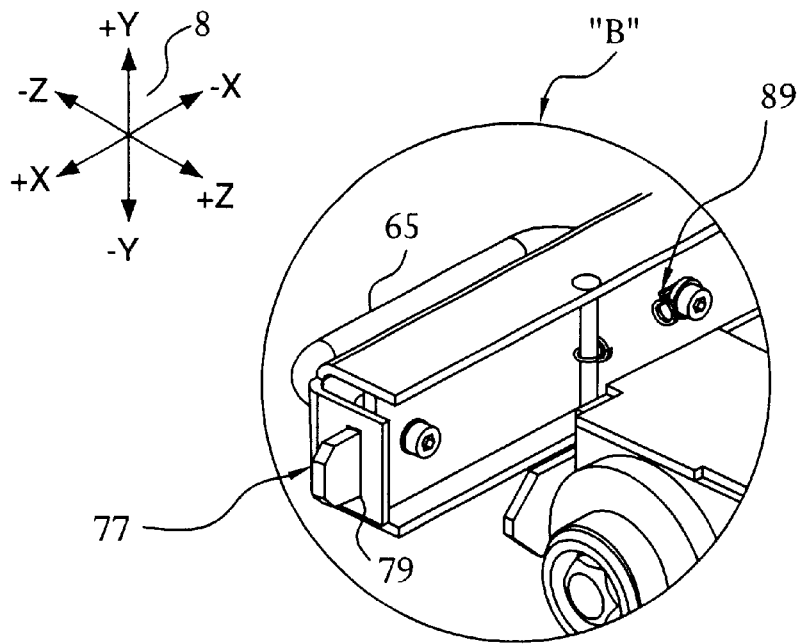
FIG. 4 is a magnified view of the area designated "B" in FIG. 2, depicting a locking handle of the circuit breaker in a "locked" position.

A locking tab 77 is fixedly coupled to an end of the first locking arm 70, and a locking tab 83 is fixedly coupled to an end of the second locking arm 72 (see FIG. 4). The locking tabs 77, 83 each project through a corresponding slot 79 formed in opposing ends of the channel member 62 when the handles 65, 67 are in the locked position. The tabs 77, 83 retract into the channel member 62 when the handles 65, 67 are in the unlocked position The locking arm 70 has a slot 81 formed therein (see FIG. 5). The slot 81 extends inwardly from an end of the locking arm 70. The locking arm 72 has slot 82 formed therein. The slot 82 extends inwardly from an end of the locking arm 72. The slot 82 has a curvilinear forward portion 82a and a substantially rearward portion 82b.

The locking arms 70, 72 are biased outwardly by springs 89 (shown in part in FIGS. 1 and 4). In other words, the locking arm 70 is spring-biased in the "+x" direction and the locking arm 72 is spring-biased in the "−x" direction. Hence, the handles 65, 67 are also biased outwardly, i.e., toward the locked position.

Figure 5:
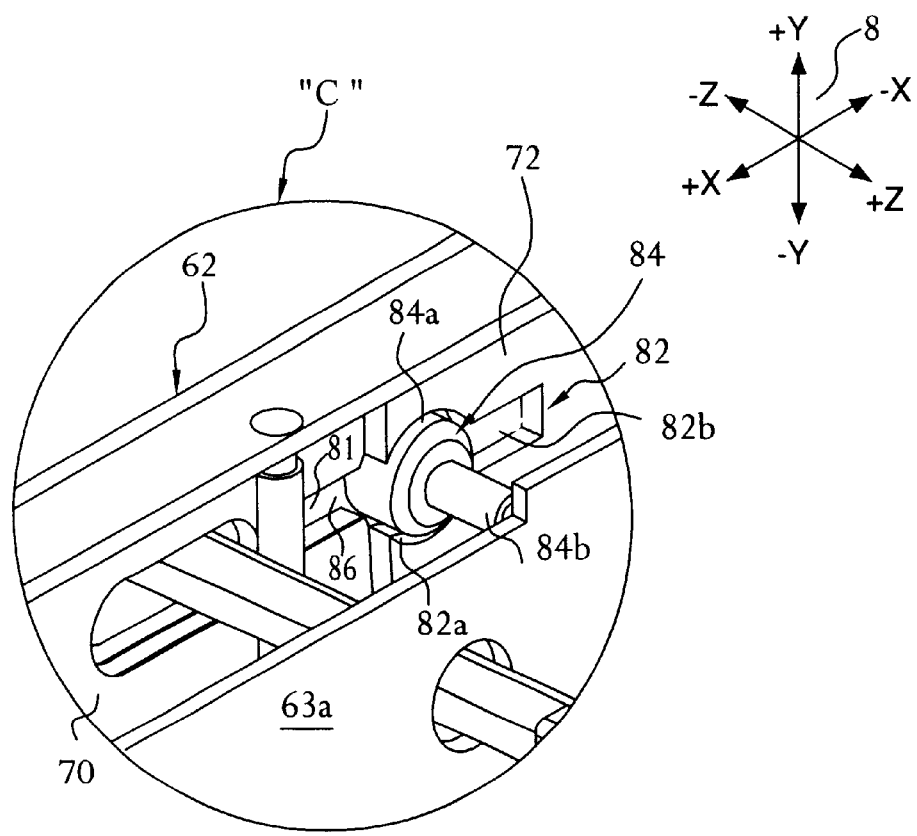
FIG. 5 is a magnified view of the area designated "C" in FIG. 2, depicting a locking arm of the circuit breaker engaging a large-diameter portion of a handle interlock member.

The racking mechanism 61 also comprises a handle interlock member 84 (see FIGS. 2 and 5). The handle interlock member 84 comprises a first portion 84a, and a substantially cylindrical small-diameter portion 84b that projects from the large-diameter portion 84a along a centerline "C1" of the handle interlock member 84. The large-diameter portion 84a is adapted to fit within the forward portion 82a of the slot 82 with minimal clearance. The small-diameter portion 84b is adapted to fit within the slot 81 of the locking arm 70 with minimal clearance. The small-diameter portion 84b is also adapted to fit within the rearward portion 82b of the slot 82 with minimal clearance. The significance of this feature is discussed below.

The handle interlock member 84 is movably coupled to the channel member 62. More particularly, the handle interlock member 84 supported by a bracket member 86. The bracket member 86 is fixedly coupled to the channel member 62. The bracket member 86 restrains the handle interlock member 84 in the "x" and "y" directions. The bracket member 86 permits the handle interlock member 84 to translate in the "z" direction. The handle interlock member 84 is spring-biased in the "+z" direction.

The locking arms 70, 72 and the channel member 62 restrain the support truck 63 and the circuit breaker 10 in relation to the switchgear enclosure. In particular, the locking tabs 77, 83 are adapted to engage complementary slots on the switchgear enclosure when the truck handles 65, 67 are in the locked position. Engagement of the locking tabs 77, 83 and the complementary slots prevents the locking arms 70, 72 and, thus, the channel member 62, from translating in the "z" direction in relation to the switchgear enclosure. Hence, translation of the support truck 63 and the circuit breaker 10 relative to the switchgear enclosure is not permitted when the truck handles 65, 67 are in the locked position and the lead screw 76 is not actuated.

The truck handles 65, 67 can be moved to the unlocked position only when the circuit breaker 10 is in the disconnect position. Hence, the circuit breaker 10 cannot be removed from the switchgear enclosure when the circuit breaker 10 is in the connect or test positions, when the circuit breaker 10 is between the connect and test positions, or when the circuit breaker 10 is between the test and disconnect positions. This feature is due to the configuration of the locking arms 70, 72 and the handle interlock member 84. In particular, the forward portion 82a of the slot 82 is substantially aligned with the handle interlock member 84 when the truck handles 65, 67 are in the locked position (as depicted in FIG. 5). The spring bias of the handle interlock member 84 causes the large-diameter portion 84a to reside within the forward portion 82a when the forward portion 82a are substantially aligned with the handle interlock member 84.

The large-diameter portion 84a fills a substantial entirety of the forward portion 82a, as shown in FIG. 5. Attempted movement of the truck handle 67 thus causes interference between the large-diameter portion 84a and the locking arm 72. Attempted movement of the truck handle 65 causes interference between the large-diameter portion 84b an end of the locking arm 70 due to the inability of the large-diameter portion 84b to fit within the slot 81. This interference prevents movement of the locking arms 70, 72 and the truck handles 65, 67 in relation to the channel member 62. Hence, the locking tabs 77, 83 cannot be removed from the complementary slots on the switchgear enclosure when the circuit breaker 10 is in any position other than the disconnect position.

Movement the circuit breaker 10 to the disconnect position releases the locking arms 70, 72 and thereby facilitates removal of the circuit breaker 10 from the switchgear enclosure. More particularly, the movement of the circuit breaker 10 from the test position toward the disconnect position causes a longitudinal member 63a of the support truck 63 to contact the small-diameter portion 84b of the handle interlock member 84. Continued movement of the circuit breaker 10 toward the disconnect position causes the longitudinal member 63a to urge the handle interlock member 84 in the "−z" direction, against the spring bias of thereof. Continued movement of the handle interlock member 84 in the "−z" direction eventually urges the large-diameter portion 84a out of the slot 82.

Movement of the truck handles 65, 67 from the locked to the unlocked position is possible when the large-diameter portion 84a has moved out of the slot 82. More particularly, the noted movement of the handle interlock member 84 in the "−z" direction eventually moves the small-diameter portion into the slot 82. The small-diameter portion 84b is substantially smaller than the forward portion 82a of the slot 82. Furthermore, the small-diameter portion 84b is adapted to fit within the slot 81, and within the rearward portion 82b of the slot 82, as previously noted. Hence, the handle interlock member 84 does not interfere with movement of the locking arms 70, 72 when the truck handles 65, 67 are moved from the locked to the unlocked position under this set of conditions.

The circuit breaker 10 also comprises a mechanical interlock 12 and an electrical interlock 90. The mechanical interlock 12 and the electrical interlock 90 each prevent the contacts 20, 26 from closing when the circuit breaker 10 is not positioned in either the connect, test, or disconnect positions. The mechanical interlock 12 and the electrical interlock 90 are described in detail in co-pending U.S. patent application Ser. No. 10/023,568.

Details relating to the capacitor discharge system are as follows. The capacitor discharge system comprises an elongated switch lever 102, a discharge circuit switch 104, a capacitor discharge circuit 105, and a ten-ohm discharge resistor 106. The capacitor discharge circuit 105 is electrically coupled to the electronic control circuit 15. A suitable resistor 106 is available from EBG Corp. as part number UXP-600. (It should be noted that the resistance of the discharge resistor 106 is application dependent; a specific value is specified for exemplary purposes only.)

Figure 6:
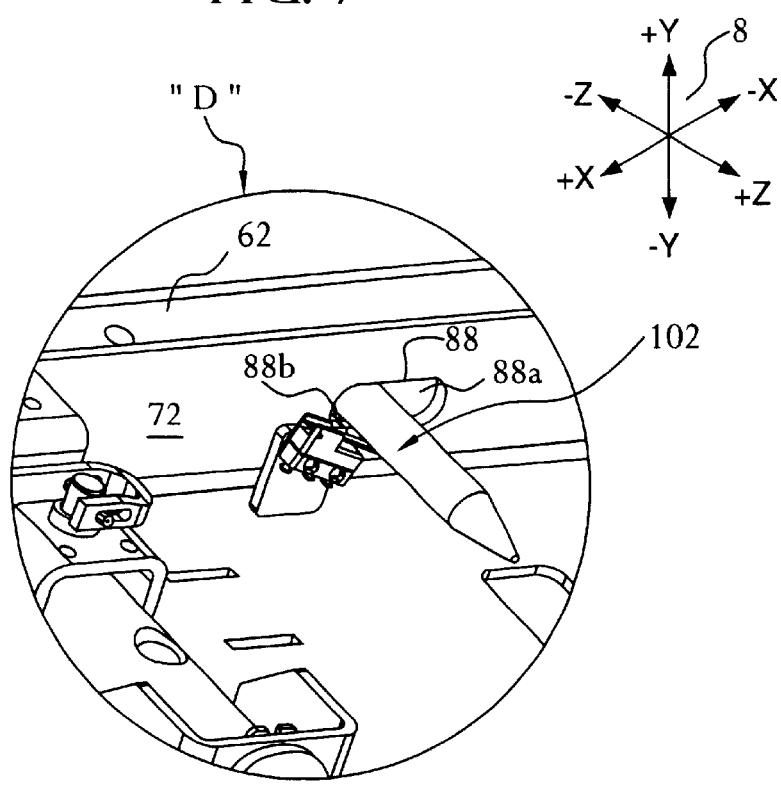
FIG. 6 is a magnified view of the area designated "D" in FIG. 2, depicting a contact switch of a capacitor discharge system of the circuit breaker in a "closed" position.

The switch lever 102 is fixedly coupled to the locking arm 72, and extends from the locking arm 72 substantially in the "+z" direction (see FIGS. 2 and 6). The switch lever 102 is adapted to extend through the longitudinal member 63a of the support truck 63 by way of a slot 88 formed therein. More particularly, the switch lever 102 extends through the slot 88 when the circuit breaker 10 is in the disconnect position (as depicted in FIG. 6).

The slot 88 is elongated in the "x" direction, and thus facilitates a limited degree of relative movement between the switch lever 102 and the support truck 63 in the "x" direction. The switch lever 102 resides in a first, or "noncontact," position proximate a first end 88a of the slot 88 when the second truck handle 67 is in the locked position. The switch lever 102 resides in a second, or "contact," position proximate a second end 88b of the slot 88 when the second truck handle 67 is in the unlocked position (as depicted in FIG. 6).

The discharge circuit switch 104 is electrically coupled to the electronic control circuit 105, and functions as a contact switch (see FIGS. 6 and 8). In other words, a portion of the discharge circuit switch 104 is movable between an "open" and a "closed" position (the discharge circuit switch 104 is biased toward the open position). Continuity is established between the electrical input and output of the discharge circuit switch 104 when the discharge circuit switch 104 is in the closed position. Continuity between the electrical input and output of the discharge circuit switch 104 is not present when the discharge circuit switch 104 is in the open position. The discharge circuit switch 104 thus provides an electrical input, or "closed" signal, to the capacitor discharge circuit 105 when the discharge circuit switch 104 is in the closed position.

The discharge circuit switch 104 is coupled to the longitudinal member 63a of the support truck 63, proximate the slot 88. More particularly, the discharge circuit switch 104 is positioned so that an end 102a of the switch lever 102 contacts the discharge circuit switch 104 when the second truck handle 67 is in the unlocked position (as depicted in FIG. 6). This contact urges the discharge circuit switch 104 into the closed position. Hence, the discharge circuit switch 104 provides a "closed" signal to the capacitor discharge circuit 105 when the second truck handle 67 is in the unlocked position.

The end 102a of the switch lever 102 does not contact the discharge circuit switch 104 when the second truck handle 67 is in the locked position. Hence, the discharge circuit switch 104 resides in the open position, and the capacitor discharge circuit 105 does not receive a "closed" signal when the second truck handle 67 is in the locked position.

The capacitor discharge circuit 105 is adapted to discharge the capacitor 60 when the truck handle 72 is moved to the unlocked position. More particularly, the capacitor discharge circuit 105 comprises a relay 108 that is activated in response to a "closed" signal from the discharge circuit switch 104 (see FIG. 8). Activation of the relay 108 electrically couples the capacitor 60 and the discharge resistor 106.

Figure 7:
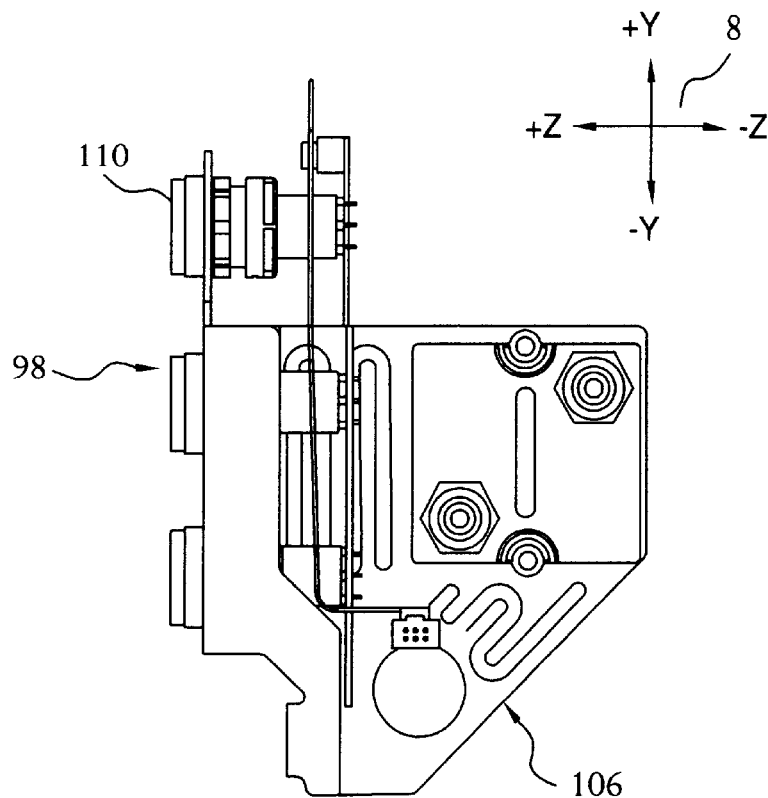
FIG. 7 is a side view of a resistor and a pushbutton control panel of the circuit breaker shown in FIGS. 1–6.

The capacitor discharge circuit 105 also activates an LED 110 on the control panel 98 in response to a "closed" signal from the discharge circuit switch 104 (see FIG. 7). The brightness of the LED 110 is proportional to the instantaneous charge of the capacitor 60. Hence, the LED 110 provides a visual indication that the capacitor 60 is discharging.

The flow of current from the charged capacitor 60 to the discharge resistor 106 discharges the capacitor 60. Hence, the stored electrical potential of the capacitor 60 is discharged automatically in response to movement of the truck handle 67 to the unlocked position. The capacitor discharge circuit 105 causes the relay 108 to remain activated for approximately twenty seconds, regardless of whether the truck handle 67 is moved back to the locked position (in practice, the discharge resistor 106 substantially discharges the capacitor 60 relatively quickly, i.e., in approximately five seconds or less).

The brightness of the LED 110 fades as the capacitor 60 discharges. The LED 110 eventually reaches a darkened condition, thereby providing a visual indication that the capacitor 60 is substantially discharged. The circuit breaker 10 can thus be removed from the switchgear enclosure with little or no possibility of personnel injury caused by inadvertent contact with the charged capacitor 60.

The capacitor discharge circuit 105 deactivates the relay 108 at the end of the twenty-second interval, thereby permitting the capacitor 60 to be recharged if the circuit breaker 10 is still in the switchgear enclosure. Limiting the activation period for the relay 108 prevents simultaneous recharging and discharging of the capacitor 60 over an extended period if the circuit breaker 10 is not removed from the switchgear after the truck handle 67 is moved to the unlocked position. (Simultaneous recharging and discharging of the capacitor 60 over an extended period can damage the capacitor 60, the discharge resistor 106, and their associated circuitry.)

Figure 10:
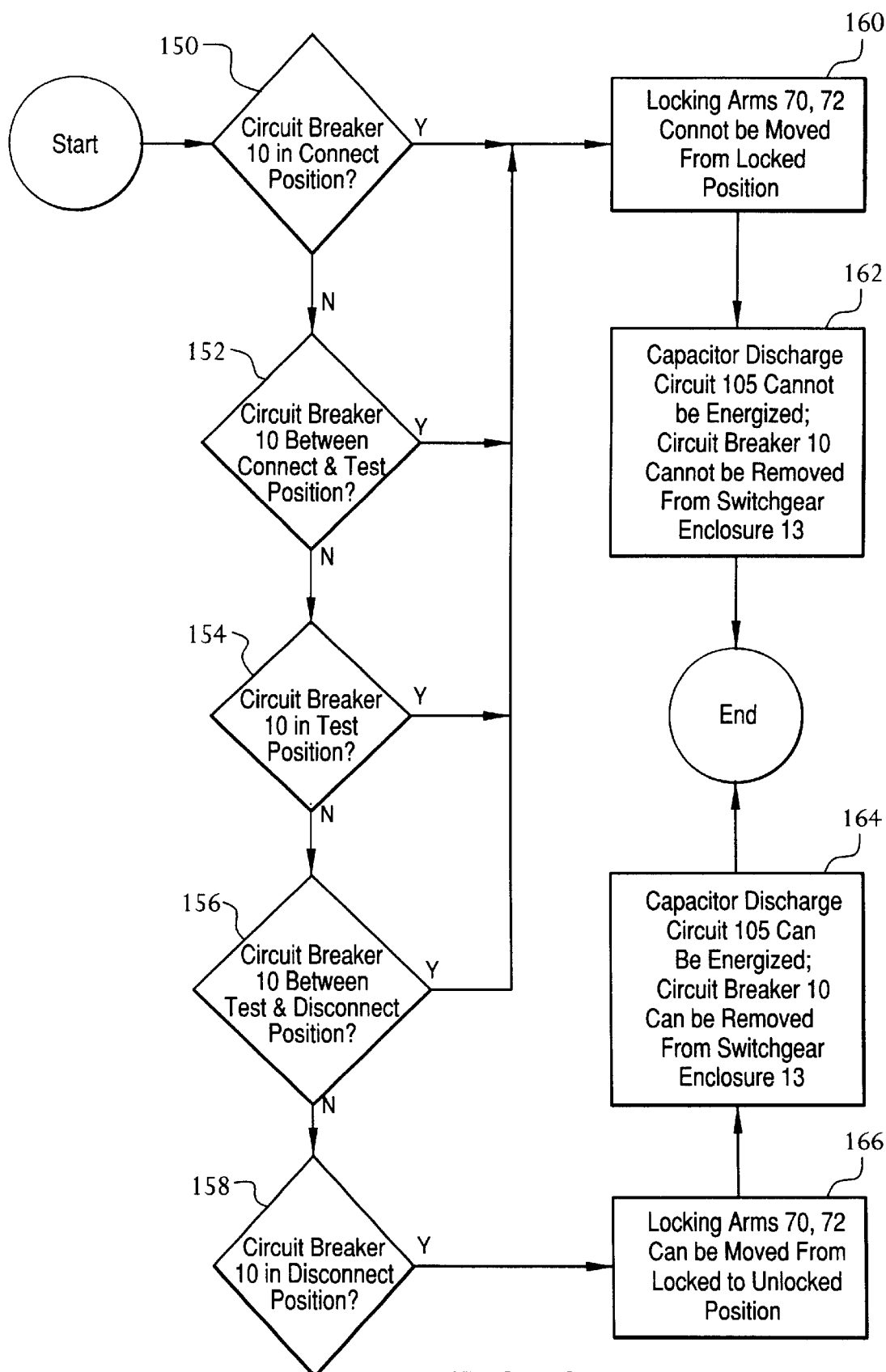
FIG. 10 is a flow diagram depicting functional details of the circuit breaker shown in FIGS. 1–9.

Functional details of the capacitor discharge system are presented in the form of a flow chart in FIG. 10. FIG. 10 indicates that the truck handle 67 cannot be moved from the locked to the unlocked position when the circuit breaker 10 is in the connect or test positions, when the circuit breaker 10 is between the connect and test positions, or when the circuit breaker 10 is between the test and disconnect positions. Hence, the capacitor discharge circuit 105 cannot be activated and the capacitor 60 cannot be discharged into the resistor 106 when the circuit breaker 10 is in the connect or test positions, when the circuit breaker 10 is between the connect and test positions, or when the circuit breaker 10 is between the test and disconnect positions (blocks 150, 152, 154, 160, 162).

FIG. 10 also indicates that the truck handle 67 can be moved from the locked to the unlocked position if the circuit breaker 10 is in the disconnect position. Hence, the capacitor discharge circuit 105 can be activated and the capacitor 60 can be discharged into the resistor 106 when the circuit breaker 10 is in the disconnect position (blocks 158, 164, 166).

The capacitor discharge system provides substantial protection against personal injury or death caused by accidental contact with the capacitor 60. The capacitor discharge system performs this protective function using a minimal number relatively simple, robust parts. The overall simplicity of the capacitor discharge system is due primarily to the integration of the capacitor discharge system with other components of the racking mechanism 61. In particular, the capacitor discharge system is mechanically linked to the racking mechanism 61 in a manner that causes the racking mechanism 61 to selectively activate the capacitor discharge system. Hence, additional components needed to provide the activation function are not required, thereby minimizing the overall parts count of the capacitor discharge system.

Furthermore, the kinematic relationship between the racking mechanism 61 and the capacitor discharge system is relatively simple. The overall simplicity of the capacitor discharge system makes the capacitor discharge system a relatively inexpensive, compact, and reliable safeguard against accidental discharge of the capacitor 60. In addition, the safety-enhancing effect capacitor discharge system is increase by the LED 110, which provides a positive visual indication that the capacitor 60 is discharged.

It is to be understood that even though numerous characteristics and advantages of the present invention have been set forth in the foregoing description, together with details of the structure and function of the invention, the disclosure is illustrative only, and changes may be made in detail, especially in matters of shape, size, and arrangement of the parts, within the principles of the invention.

What is claimed is:

1. A circuit breaker adapted to be installed in a switchgear enclosure, comprising:

a support truck comprising a longitudinally-oriented member, a laterally-oriented member fixedly coupled the longitudinally-oriented member, and a wheel rotatably coupled to the laterally-oriented member;

a contact mechanism fixedly coupled to the support truck and comprising a first and a second contact member;

an actuator mechanism comprising a coil, a capacitor adapted to energize the coil on a selective basis, and an armature mechanically coupled to the second contact member and adapted to urge the second contact member into electrical contact with the first contact member in response to energization of the coil;

a racking mechanism adapted to move the support truck in relation to the switchgear enclosure, the racking mechanism comprising a channel member and a locking arm mechanically coupled to the channel member and movable between a locked position wherein the locking arm is adapted to engage a slot on the switchgear enclosure, and an unlocked position wherein the locking arm is disengaged from the slot; and a capacitor discharge system comprising a switch lever rigidly coupled to the locking arm, a capacitor discharge circuit, a contact switch mechanically coupled to the support truck and movable between an open and a closed position, a resistor electrically coupled to the capacitor discharge circuit and the capacitor, and a relay electrically coupled to the capacitor discharge circuit, the capacitor, and the resistor, wherein the switch lever is adapted to move the contact switch from the open to the closed position when the locking arm is moved from the locked to the unlocked position, and the capacitor discharge circuit is adapted to energize the relay when the contact switch is moved to the closed position thereby establishing electrical contact between the capacitor and the resistor.

2. The circuit breaker of claim 1, wherein the racking mechanism is adapted to move the circuit breaker between a connect, a test, and a disconnect position and the racking mechanism further comprises a handle interlock member movably coupled to the channel member, the handle interlock member being adapted to interfere with movement of the locking member from the locked to the unlocked position when the circuit breaker is in the connect or the test positions, when the circuit breaker is between the connect and the test positions, and when the circuit breaker is between the test and the disconnect positions.

3. The circuit breaker of claim 2, wherein:

the handle interlock member comprises a large-diameter portion and a small-diameter portion;

the locking arm has a slot formed therein, the slot formed in the locking arm having a forward portion adapted to receive the large-diameter portion and the small-diameter portion, and a rearward portion adapted to receive only the small-diameter portion; and the large diameter portion is disposed within the forward portion when the circuit breaker is in the connect or the test positions, when the circuit breaker is between the connect and the test positions, and when the circuit breaker is between the test and the disconnect positions, and the small diameter portion is disposed within one of the forward and rearward portions when the circuit breaker is in the disconnect position.

4. The circuit breaker of claim 3, wherein the large diameter portion of the handle interlock member is movable into and out of the forward portion in response to movement of the support truck.

5. The circuit breaker of claim 4, wherein the handle interlock member contacts the longitudinally-oriented member of the support truck when the circuit breaker moves from the test position to the disconnect position thereby urging the large diameter portion of the handle interlock member out of the forward portion.

6. The circuit breaker of claim 3, wherein the locking arm is movable in a first direction between the unlocked and the locked positions and the handle interlock member is movable in a second direction in relation to the locking arm, the second direction being substantially perpendicular to the first direction.

7. The circuit breaker of claim 1, wherein the longitudinally-oriented member has a slot formed therein and a portion of the lever is positioned within the slot formed in the longitudinally-oriented member when the circuit breaker is in the disconnect position.

8. The circuit breaker of claim 7, wherein the locking arm is movable in a first direction between the locked and the unlocked positions and the slot formed in the longitudinally-oriented member is elongated in the first direction.

9. The circuit breaker of claim 1, wherein the locking arm comprises a tab portion disposed at an end thereof, the tab portion being adapted to engage the slot formed in the switchgear enclosure.

10. The circuit breaker of claim 9, wherein the locking arm is slidably disposed within the channel member.

11. The circuit breaker of claim 10, wherein the tab portion is adapted to project through a slot formed in an end of the channel member when the locking arm is in the locked position.

12. The circuit breaker of claim 1, further comprising a second of the locking arms.

13. The circuit breaker of claim 1, wherein the locking arm is biased toward the locked position.

14. The circuit breaker of claim 1, wherein the racking mechanism further comprises a truck handle fixedly coupled to the locking arm.

15. The circuit breaker of claim 11, wherein the truck handle projects through a slot formed in the channel member.

16. The circuit breaker of claim 1, wherein the capacitor discharge circuit is adapted to energize the relay for a predetermined amount of time.

17. The circuit breaker of claim 1, wherein the predetermined amount of time is approximately twenty seconds.

18. The circuit breaker of claim 1, further comprising a light electrically coupled to the capacitor discharge circuit, the capacitor discharge circuit being adapted to energize the light in proportion to a charge of the capacitor.

19. The circuit breaker of claim 1, wherein the light is an LED.

20. The circuit breaker of claim 1, wherein the racking mechanism further comprises a racking screw rotatably coupled to the channel member and the support truck, and the support truck is movable in relation to the channel member in response to rotation of the racking screw.

21. The circuit breaker of claim 1, wherein the contact switch is mechanically coupled to the longitudinally-oriented member of the support truck.

22. The circuit breaker of claim 1, wherein movement of locking arm from the locked to the unlocked position brings the switch lever into contact with the contact switch.

23. A circuit breaker adapted for use in a switchgear enclosure, comprising a support truck adapted to translate in relation of the switchgear enclosure, a first and a second contact member mounted on the support truck, a coil, a capacitor adapted to energize the coil, an armature adapted to move the second contact member in response to energization of the coil, a racking mechanism comprising a locking arm movable between a locked position wherein the locking arm is adapted to engage the switchgear enclosure, and an unlocked position wherein the locking arm is disengaged from the switchgear enclosure, and a capacitor discharge system comprising (i) a capacitor discharge circuit electrically coupled to the capacitor, (ii) a contact switch mechanically coupled to the support truck and electrically coupled to the capacitor discharge circuit and being movable between a first and a second position, (iii) a resistor electrically coupled to the capacitor discharge circuit, and (iv) a lever arm rigidly coupled to the locking arm and adapted to move the contact switch from the first to the second position when the locking arm is moved from the locked to the unlocked position, wherein the capacitor discharge system is adapted to electrically couple the capacitor and the resistor when the contact switch is in the second position.

24. The circuit breaker of claim 23, wherein the racking mechanism is adapted to move the circuit breaker between a first and a second position and the racking mechanism further comprises a handle interlock member movably coupled to the channel member, the handle interlock member being adapted to interfere with movement of the locking arm from the locked to the unlocked position when the circuit breaker is in the first position, and when the circuit breaker is between the first and the second positions.

25. The circuit breaker of claim 24, wherein:

the handle interlock member comprises a large-diameter portion and a small-diameter portion;

the locking arm has a slot formed therein, the slot formed in the locking arm having a forward portion adapted to receive the large-diameter portion and the small-diameter portion, and a rearward portion adapted to receive only the small-diameter portion; and the large diameter portion is disposed within the forward portion when the circuit breaker is in the first position, and when the circuit breaker is between the first and the second positions, and the small diameter portion is disposed within one of the forward and rearward portions when the circuit breaker is in the second position.

26. A circuit breaker adapted for use in a switchgear enclosure, comprising a support truck, a contact member mounted on the support truck, a coil, a capacitor adapted to energize the coil, an armature adapted to move the contact member in response to energization of the coil, a racking mechanism adapted to move the support truck in relation to the switchgear enclosure and comprising a locking arm movable between a locked position wherein the locking arm is adapted to engage the switchgear enclosure, and an unlocked position wherein the locking arm is disengaged from the switchgear enclosure, and a capacitor discharge system comprising a resistor and a capacitor discharge circuit adapted to electrically couple the capacitor and the resistor in response to movement of the locking arm from the locked to the unlocked positions.

27. A system for automatically discharging a capacitor of a circuit breaker adapted for use in a switchgear enclosure, comprising:

a capacitor discharge circuit adapted to be electrically coupled to the capacitor;

a contact switch electrically coupled to the capacitor discharge circuit and adapted to be mechanically coupled to a support truck of the circuit breaker, the contact switch being movable between a first and a second position;

a resistor electrically coupled to the capacitor discharge circuit; and a lever arm adapted to be rigidly coupled to a racking mechanism of the circuit breaker and adapted to urge the contact switch into the closed position when a locking arm of the racking mechanism disengages from the switchgear enclosure, wherein the capacitor discharge system is adapted to electrically couple the capacitor and the resistor when the contact switch is in the second position thereby discharging the capacitor.

28. A method of removing a circuit breaker from a switchgear enclosure to minimize a possibility of personnel injury caused by contact with a capacitor of the circuit breaker, comprising:

disengaging a locking handle of the circuit breaker from the switchgear enclosure and moving a contact switch of the circuit breaker to a closed position to establish electrical contact between the capacitor and a resistor by moving the locking handle from a locked to an unlocked position; and applying a force to the circuit breaker to urge the circuit breaker out of the switchgear enclosure.

* * * * *